(12) United States Patent
Schnipke et al.

(10) Patent No.: US 7,296,926 B2
(45) Date of Patent: Nov. 20, 2007

(54) MIXER, MIXING IMPLEMENT AND ASSOCIATED ATTACHMENT MECHANISM

(75) Inventors: Janice J. Schnipke, Springfield, OH (US); Neal H. Blackburn, Springfield, OH (US)

(73) Assignee: Premark FEG L.L.C., Wilmington, DE (US)

( * ) Notice: Subject to any disclaimer, the term of this patent is extended or adjusted under 35 U.S.C. 154(b) by 468 days.

(21) Appl. No.: 11/068,178

(22) Filed: Feb. 28, 2005

(65) Prior Publication Data

US 2006/0193201 A1 Aug. 31, 2006

(51) Int. Cl.
*B01F 7/18* (2006.01)
(52) U.S. Cl. .................. 366/331; 366/197; 366/343; 403/324; 403/325; 403/328
(58) Field of Classification Search ............... 366/197, 366/207, 331, 343; 403/324–328
See application file for complete search history.

(56) References Cited

U.S. PATENT DOCUMENTS

| | | | |
|---|---|---|---|
| 535,880 A | | 3/1895 | Anderson |
| 617,500 A | * | 1/1899 | Ehling .................. 403/106 |
| 1,167,336 A | | 1/1916 | Clark |
| 1,175,530 A | | 3/1916 | Kirchoff |
| 1,264,128 A | | 4/1918 | Rataiczak et al. |
| 1,467,820 A | | 9/1923 | Trust et al. |
| 1,490,705 A | * | 4/1924 | Lauterbur .................. 403/341 |
| 1,783,437 A | | 12/1930 | Laib |
| 2,169,014 A | | 8/1939 | Aalborg |
| 2,192,844 A | | 3/1940 | Bean |
| 2,329,640 A | | 9/1943 | Moeller |
| 2,621,906 A | | 12/1952 | Van Guilder |
| 2,630,303 A | | 3/1953 | Krucker |
| 2,639,904 A | | 5/1953 | McMaster et al. |
| 2,662,712 A | * | 12/1953 | Rose ........................... 248/408 |
| 2,677,401 A | * | 5/1954 | Schwaneke .................. 99/501 |

(Continued)

FOREIGN PATENT DOCUMENTS

EP 1 262 131 A 12/2004

(Continued)

OTHER PUBLICATIONS

Instructions manual entitled "H600 & L800 Mixers," Hobart Corporation (Dec. 1999).

(Continued)

*Primary Examiner*—David Sorkin
(74) *Attorney, Agent, or Firm*—Thompson Hine LLP

(57) ABSTRACT

A mixing implement includes a body having a mixing portion and a connecting portion, the connecting portion having an upper shaft receiving opening formed therein and a side opening that leads to the shaft receiving opening, the shaft receiving opening having a drive pin receiving recess, the side opening and the drive pin receiving recess located substantially diametrically opposite each other with the side opening at a height corresponding to at least part of the drive pin receiving recess. A retainer is movably coupled with the connecting portion through the side opening and biased into an inward position in which an inner portion of the retainer is normally positioned within the shaft receiving opening, the retainer movable to an outward position in which the inner portion of the retainer is at least partially retracted from the shaft receiving opening.

12 Claims, 4 Drawing Sheets

U.S. PATENT DOCUMENTS

| | | |
|---|---|---|
| 2,832,575 A | 4/1958 | Cirone |
| 2,833,576 A | 5/1958 | Cirone |
| 3,243,165 A | 3/1966 | De Woody et al. |
| 4,079,917 A | 3/1978 | Popeil |
| 4,337,000 A | 6/1982 | Lehmann |
| 4,436,125 A | 3/1984 | Blenkush |
| 4,541,457 A | 9/1985 | Blenkush |
| 4,760,984 A | 8/1988 | Hennessey |
| 4,857,706 A | 8/1989 | Diamond |
| 4,946,285 A | 8/1990 | Vennemeyer |
| 5,052,725 A | 10/1991 | Meyer et al. |
| 5,104,158 A | 4/1992 | Meyer et al. |
| 5,316,041 A | 5/1994 | Ramacier, Jr. et al. |
| 5,464,300 A | 11/1995 | Crainich |
| 5,494,074 A | 2/1996 | Ramacier, Jr. et al. |
| 5,556,201 A | 9/1996 | Veltrop et al. |
| 5,567,047 A | 10/1996 | Fritsch |
| 5,758,963 A | 6/1998 | Xie et al. |
| 5,791,777 A | 8/1998 | Mak |
| 5,911,403 A | 6/1999 | deCler et al. |
| 5,934,802 A | 8/1999 | Xie |
| 5,938,244 A | 8/1999 | Meyer |
| 5,975,489 A | 11/1999 | deCler et al. |
| 6,024,124 A | 2/2000 | Braun et al. |
| 6,082,401 A | 7/2000 | Braun et al. |
| 6,439,760 B1 | 8/2002 | Langeloh et al. |
| 6,908,222 B2 * | 6/2005 | Brunswick et al. ......... 366/331 |
| 2002/0093877 A1 | 7/2002 | Brunswick et al. |
| 2002/0181322 A1 | 12/2002 | Brunswick et al. |

FOREIGN PATENT DOCUMENTS

| | | |
|---|---|---|
| GB | 889462 | 2/1962 |
| WO | WO 03/037494 A1 | 5/2003 |

OTHER PUBLICATIONS

Service manual entitled "Models H-600 and H-600-T and L-800 Mixers," Hobart Corporation (Sep. 1977).

* cited by examiner

MIXER, MIXING IMPLEMENT AND ASSOCIATED ATTACHMENT MECHANISM

TECHNICAL FIELD

This application relates generally to an attachment mechanism or system used with a mixing machine and, more specifically, an attachment mechanism used for connecting mixing implements to a rotatable output component of a mixing machine.

BACKGROUND

Mixers are used to mix and blend a variety of materials such as food products. The mixers typically include a removable mixing implement that is attachable to a rotatable and/or orbitable output shaft of the mixer. Mixing implements may come in various sizes and shapes and include agitators such as whips, dough hooks, beaters, etc. The mixing implements are typically removably coupled to the output shaft to enable the mixing implements to be removed or replaced for cleaning, repair, use of a different type of mixing implement, etc.

One common type of attachment arrangement for mixing implements is a bayonet style connection. Alternative attachment arrangements are described in U.S. Patent Publication No. US 2002/0181322 A1. While the attachment arrangements in U.S. Patent Publication No. US 2002/0181322 A1 are useful, in some cases it may be difficult to adapt such arrangements to smaller size mixers and smaller size mixing implements due to size and space limitations on smaller mixing implements and/or mixer shafts.

SUMMARY

In one aspect, a mixing implement includes a body having a mixing portion and a connecting portion, the connecting portion having an upper shaft receiving opening formed therein and a side opening that leads to the shaft receiving opening, the shaft receiving opening having a drive pin receiving recess, the side opening and the drive pin receiving recess located substantially diametrically opposite each other with the side opening at a height corresponding to at least part of the drive pin receiving recess. A retainer is movably coupled with the connecting portion through the side opening and biased into an inward position in which an inner portion of the retainer is normally positioned within the shaft receiving opening, the retainer movable to an outward position in which the inner portion of the retainer is at least partially retracted from the shaft receiving opening.

DETAILED DESCRIPTION

Figure 1:
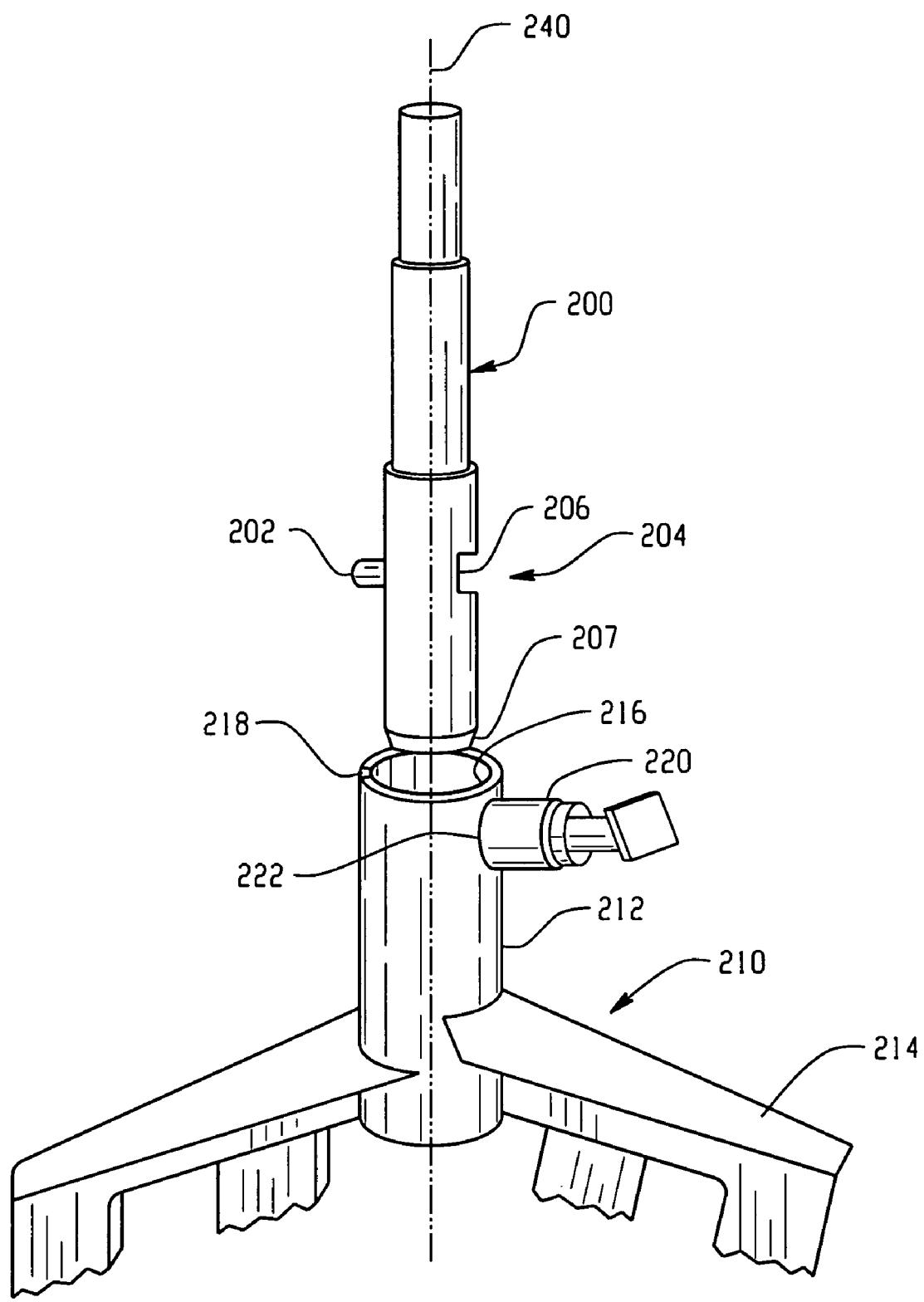
FIGS. 1-3 depict one embodiment of a mixing implement attachment system.
Figure 2:
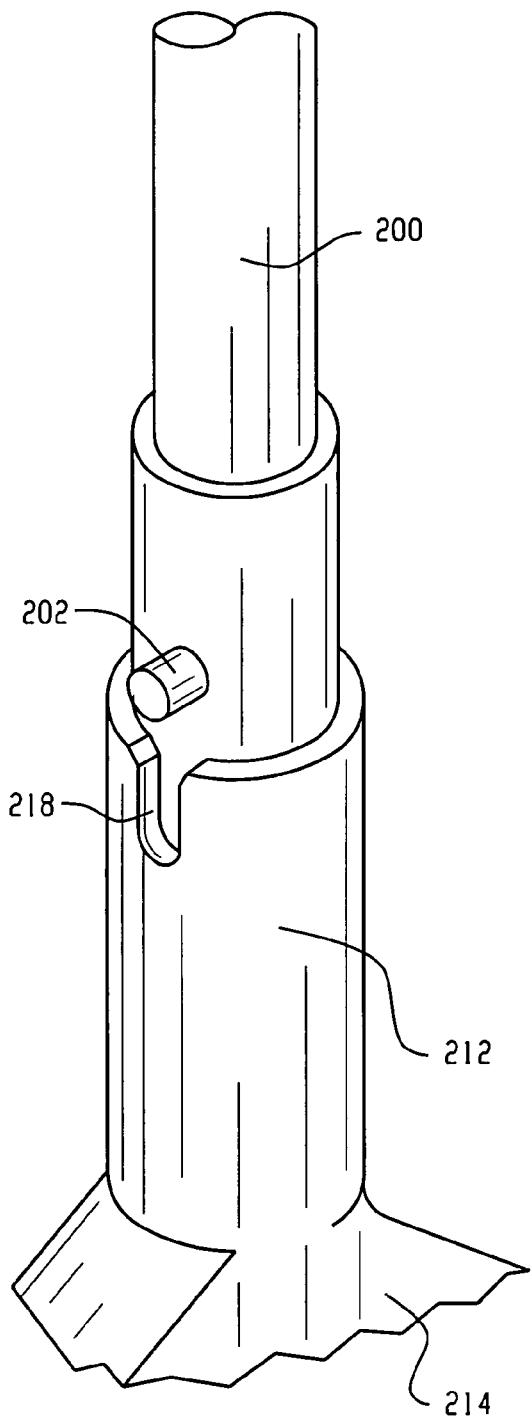
Figure 3:
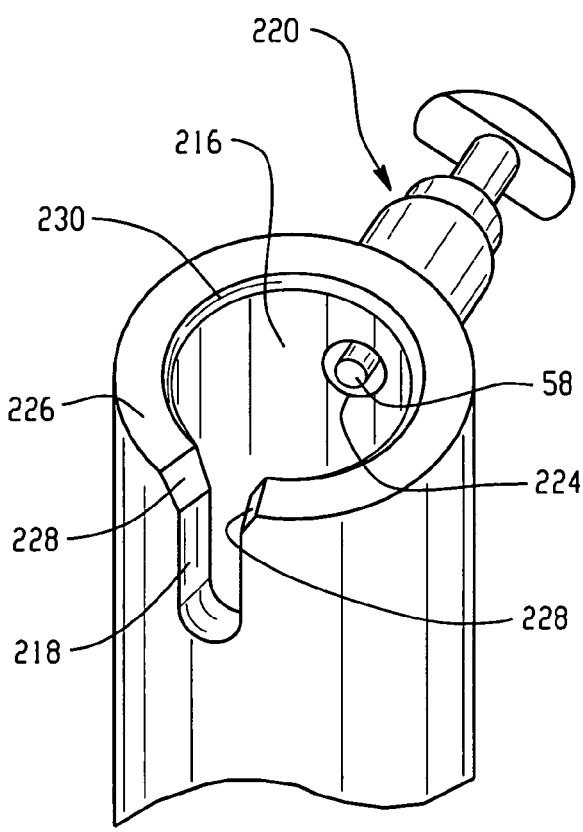

Referring now to FIGS. 1-3, a mixing implement attachment system is shown. In this exemplary arrangement, the mixer output shaft 200 includes a drive pin 202 extending outward therefrom and a recess 204. The drive pin 202 and recess 204 are located at substantially the same height or elevation along the length of the shaft 200 and are on substantially diametrically opposite sides of the shaft 200. Illustrated recess 204 does not extend around the entire periphery of the shaft 200, and in one example the recess may be formed along approximately 45 to 60 circumferential degrees of the shaft outer surface. The illustrated recess 204 has a radial depth that varies relative to a longitudinal axis 240 of the shaft 200, the recess 204 having a substantially flat inward surface 206 that results in the variable depth. However, the recess 204 could also be of uniform radial depth. Notably, the bottom portion of the shaft 200 includes a tapered or curved surface 207.

The mixing implement 210 includes an upper connecting portion 212 and a lower mixing portion 214 (shown only in part). The configuration of the mixing portion 214 can vary according to the type of mixing implement (e.g., a whisk, beater or dough hook etc.). The top of the connecting portion 212 includes an upper mixer shaft receiving opening 216. A pin receiving recess 218 joins with the upper opening 216 and receives the drive pin 202 when the shaft 200 is inserted in the opening 216. The mixing implement further includes a retaining mechanism 220 positioned substantially diametrically opposite the pin receiving recess 218. In one example the retaining mechanism may be formed by a plunger assembly similar to that shown in FIG. 4, which is described in detail below, the mechanism being inserted in a side opening 222 (FIG. 1) of the connecting portion 212. As best seen in FIG. 3, an inner portion 224 of the side opening 222 communicates with the upper opening 216 to permit an inward portion of the retaining mechanism to engage the shaft recess 204 when the mixing implement 210 is coupled to the shaft 200. In such an arrangement the combination of the recess 204 and retaining mechanism 220 vertically supports the mixing implement 210 on the shaft 200 and the combination of the drive pin 202 and the recess 218 provides for torque transfer from the shaft 200 to the mixing implement 210.

In the illustrated embodiment of FIGS. 1-3 the pin receiving recess 218 extends through an entire radial thickness of the wall 226 that defines the upper opening 216. However, non-through pin receiving recesses are contemplated. The upper entry portion of the pin receiving recess 218 may include side chamfers 228 to facilitate alignment of the shaft drive pin 204 into the recess 218 during the coupling process. Likewise, the shaft receiving opening 216 may include an entry chamfer 230 at its upper edge to facilitate proper alignment with the mixer shaft 200 during coupling.

Figure 4:
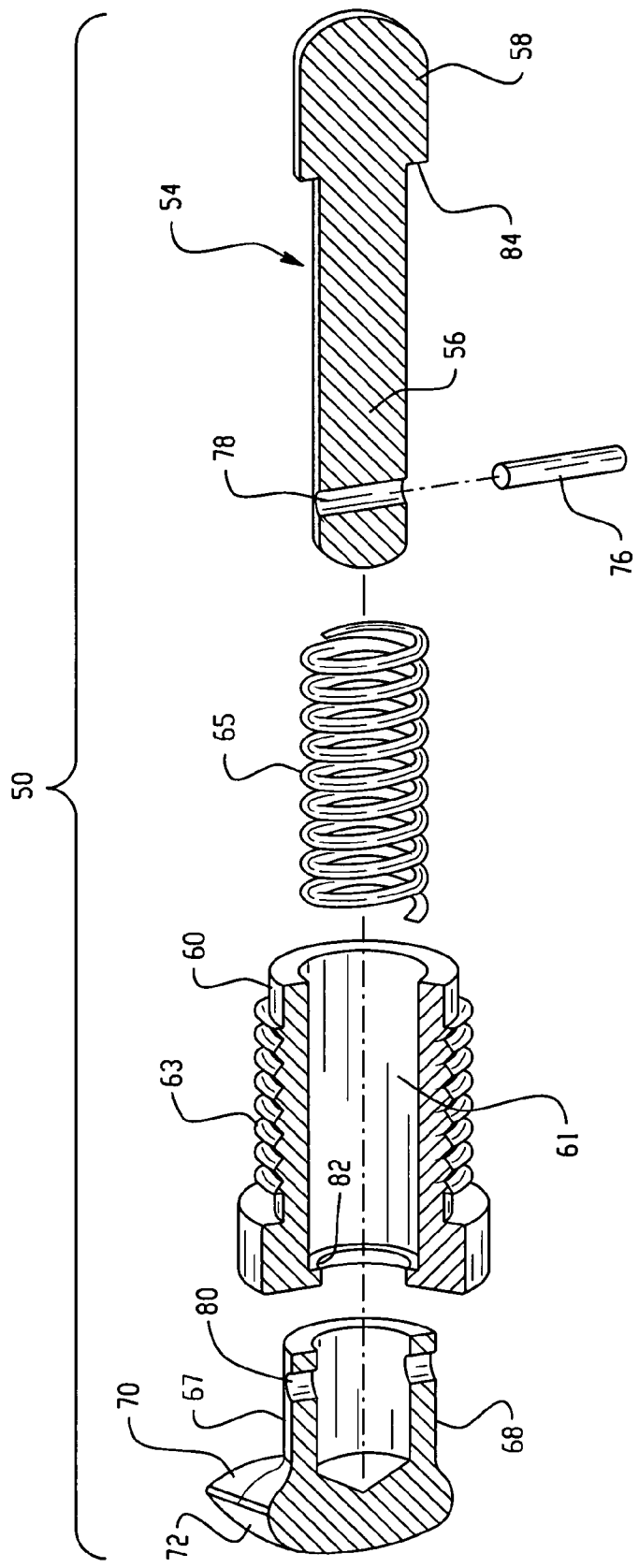
FIG. 4 is an exploded, perspective cross sectional view of the actuator assembly of the embodiment of FIGS. 1-3.

Referring now to FIG. 4, the retaining mechanism 220 may take the form of the illustrated plunger or actuator assembly 50. The assembly 50 may include a retainer or plunger 54 having a generally cylindrical plunger shaft 56 and a generally hemispherical tip 58 defining a lip 84. The tip 58 of the plunger may also be chamfered. The actuator assembly 50 may also include a generally cylindrical casing 60 having a central opening 61 defining a lip 82, with the central opening 61 being shaped to movably to receive the plunger 54 therein. The actuator assembly 50 may further include a spring 65 shaped to be disposed about the plunger shaft 56 and to be received inside the casing 60. The actuator assembly 50 may further include a button or gripping portion 67 having a hollow stem 68 and an outer portion 70, with the stem 68 being shaped and sized to receive the end of the plunger 54. The outer portion 70 may have a pair of opposed flats 72. In order to assemble the actuator assembly 50, the spring 65 is slid over the plunger shaft 56, and the plunger 54 and spring 65 are then inserted to the central opening 61 of the casing 60. The plunger is then inserted into the stem 68 of the button 67. A coupling pin 76 is then passed through aligned openings 78, 80 in the plunger shaft 56 and stem 68 to couple the plunger 54, casing 60 and button 67 together. The spring 65 is captured in a compressed manner between the lip 82 of the casing 60 and the lip 84 of the tip 58 of the plunger 54. In this manner, in the absence of outside forces, the tip 58 of the plunger 54 will protrude slightly outwardly from the casing 60 (e.g. to the right in the view of FIG. 4). The casing 60 includes threads 63 located on a portion of the outer surface thereof such that the actuator assembly can be threaded into the side opening 222 of the mixing implement 210 in a secured but removable manner, enabling replacement if necessary.

The embodiment of FIGS. 1-3 may be particularly suited for smaller mixing machines in which the size of the mixing implement 210 does not readily provide for having drive pin receiving slots located at different heights or elevations than a retaining mechanism. However, the configuration could be applied to any size mixing machine and mixing implement. During the coupling process the end of the mixer shaft 200 may engage the inner portion of the retaining mechanism 220 to automatically move the retaining mechanism from its inward position toward its retracted position. More particularly, where the end of the mixer shaft 200 includes tapered surface 207, surface 207 may interact with the rounded or tapered surface of the tip 58 of the plunger 54, urging the plunger 54 to move outward from the shaft receiving opening 216 against the biasing force of the spring 65. When the shaft recess 204 comes into alignment with the plunger 54, the spring bias causes the tip 58 of the plunger 54 to move into the recess 204 to vertically support the mixing implement 210 on the shaft 200.

Figure 5:
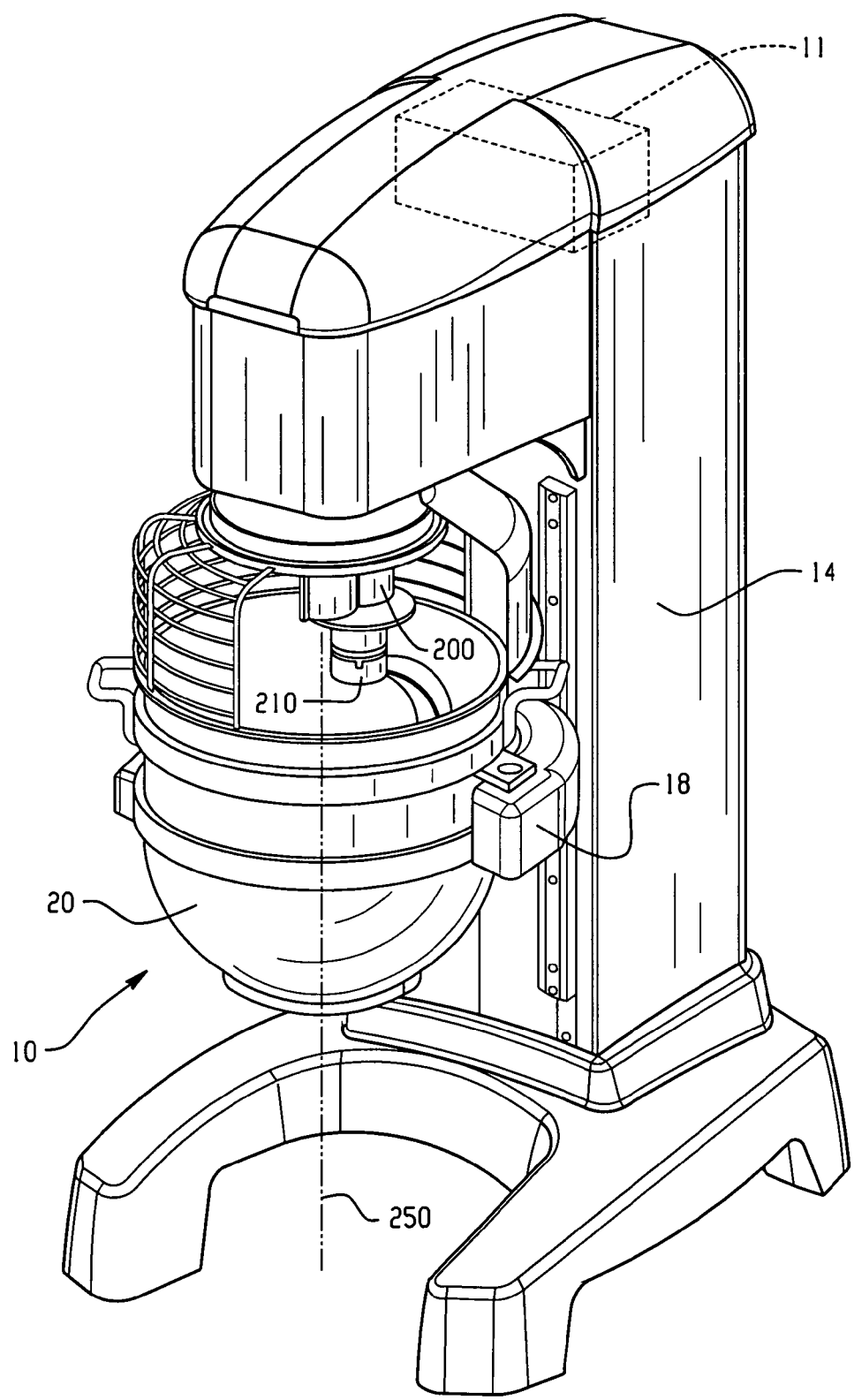
FIG. 5 shows an exemplary mixer construction.

FIG. 5 shows one embodiment of a mixer that could incorporate the mixing implement attachment system described above. The mixer 10 has a mixer body 14 which houses a motor 11 therein. The motor 11 is operatively coupled to a rotatable and orbital output shaft 200 or output component. The mixer 10 further includes a mixing implement 210 that is attachable to the output shaft 200 such that rotation and/or orbital movement of the output shaft 200 can be transferred to the mixing implement 210. During operation, the output shaft 200 and mixing implement 210 may rotate about their own axes and orbit about a central, upright bowl axis 250. The mixer body 14 may include a yoke 18 for receiving a bowl 20 thereon, such that when the bowl 20 is mounted on the yoke 18 and the mixing implement 210 is received in the bowl 20, the contents of the bowl 20 can be mixed by the rotating and/or orbiting mixing implement 210.

It is to be clearly understood that the above description is intended by way of illustration and example only and is not intended to be taken by way of limitation, and that changes and modifications are possible. Accordingly, other embodiments are contemplated.

What is claimed is:

1. A mixer comprising:
   a mixer body having a rotatable output shaft and a motor operatively coupled to the output shaft, the output shaft arranged to rotate around a shaft axis and orbit around another axis, the output shaft including a drive pin extending sidewardly therefrom and a retaining recess formed therein, the drive pin and the retaining recess on substantially diametrically opposed portions of the output shaft, a distance from a lower end of the output shaft to the drive pin is substantially the same as a distance from the lower end of the output shaft to the retaining recess;
   a mixing implement having a connecting portion with a shaft receiving opening having a drive pin receiving recess, a side opening located in the connecting portion and leading to the shaft receiving opening, and a retainer coupled to the mixing implement for movement along the side opening between an inward position in which at least part of said retainer is received in the retaining recess when the shaft is received in the shaft receiving opening to axially couple the mixing implement and the output shaft and a retracted position in which the retainer retracts from the retaining recess to permit separation of the output shaft and the mixing implement.

2. The mixer of claim 1 wherein the retainer comprises a spring-loaded plunger assembly with an external grip head.

3. The mixer of claim 1 wherein the drive pin receiving recess includes side chamfers for directing the drive pin into the drive pin receiving recess.

4. The mixer of claim 1 wherein the drive pin receiving recess extends through an entire radial thickness of a wall of the connecting portion of the mixing implement.

5. The mixer of claim 1 wherein the retaining recess includes a substantially flat inward surface.

6. The mixer of claim 1 wherein the retaining recess has a variable depth.

7. A mixing implement for attachment to a mixer, the mixing implement comprising:
   a connecting portion and a mixing portion, the mixing portion extending downward from the connecting portion, the connecting portion having an upper shaft receiving opening formed therein and a side opening that leads to the shaft receiving opening, the shaft receiving opening having a single drive pin receiving recess, the side opening and the drive pin receiving recess located on substantially diametrically opposite portions of the connecting portion with the side opening at a height corresponding to at least part of the drive pin receiving recess, the side opening spaced from a top of the connecting portion; and
   a retaining pin movably coupled with the connecting portion through the side opening, a spring positioned to bias the retaining pin into an inward position in which an inner end of the retaining pin is normally positioned within the shaft receiving opening, the retaining pin movable to an outward position in which the inner end of the retaining pin is at least partially retracted from the shaft receiving opening, the retaining pin includes a gripping portion located externally of the connecting portion for enabling manual retraction of the retaining pin from the inward position to the outward position.

8. The mixing implement of claim 7 wherein the drive pin receiving recess includes side chamfers for directing the drive pin into the drive pin receiving recess.

9. The mixing implement of claim 7 wherein the drive pin receiving recess extends through an entire radial thickness of the connecting portion of the mixing implement.

10. A mixing implement for attachment to a mixer comprising:
    a connecting portion and a mixing portion, the mixing portion extending downward from the connecting portion, the connecting portion having an upper, circumferential shaft receiving opening formed therein and a side opening that leads to the circumferential shaft receiving opening, the circumferential shaft receiving opening having a drive pin receiving recess, the side opening and the drive pin receiving recess located on substantially diametrically opposite portions of the connecting portion with the side opening at a height corresponding to at least part of the drive pin receiving recess; and a retainer movably coupled with the connecting portion through the side opening and biased into an inward position in which an inner portion of the retainer is normally positioned within the circumferential shaft receiving opening, the retainer movable to an outward position in which the inner portion of the retainer is at least partially retracted from the circumferential shaft receiving opening.

11. The mixing implement of claim 10 wherein the drive pin receiving recess includes side chamfers for directing the drive pin into the drive pin receiving recess.

12. The mixing implement of claim 10 wherein the drive pin receiving recess extends through an entire radial thickness of the connecting portion of the mixing implement.

\* \* \* \* \*